(12) United States Patent
Johnson

(10) Patent No.: US 6,881,336 B2
(45) Date of Patent: Apr. 19, 2005

(54) SPIRAL WOUND ELEMENT WITH IMPROVED FEED SPACE

(75) Inventor: Jon E. Johnson, Plymouth, MN (US)

(73) Assignee: Filmtec Corporation, Minneapolis, MN (US)

( * ) Notice: Subject to any disclaimer, the term of this patent is extended or adjusted under 35 U.S.C. 154(b) by 104 days.

(21) Appl. No.: 10/138,775

(22) Filed: May 2, 2002

(65) Prior Publication Data

US 2003/0205520 A1 Nov. 6, 2003

(51) Int. Cl.[7] .............................. C02F 1/44; B01D 63/00
(52) U.S. Cl. .................. 210/321.76; 210/650; 210/652; 210/321.74; 210/321.85; 96/4; 96/11; 428/105; 428/114
(58) Field of Search ...................... 210/321.74, 321.76, 210/321.83, 321.84, 321.85, 323.1, 650, 652; 264/167; 288.4; 156/228; 96/11, 4; 428/105, 112, 114, 156

(56) References Cited

U.S. PATENT DOCUMENTS

| | | | |
|---|---|---|---|
| 3,067,084 A | 12/1962 | Nalle | 156/167 |
| 3,365,352 A | 1/1968 | Van Burleigh et al. | 161/169 |
| 3,386,876 A | 6/1968 | Wyckoff | 161/109 |
| 3,700,521 A | 10/1972 | Gaffney | 156/167 |

(Continued)

FOREIGN PATENT DOCUMENTS

| | | | |
|---|---|---|---|
| EP | 045663 | 2/1982 | B01D/13/00 |
| EP | 0347174 | 12/1989 | B01D/13/00 |
| EP | 0836929 | 4/1998 | B32B/3/00 |
| EP | 1029553 | 8/2000 | B01D/61/08 |
| EP | 1029583 | 8/2000 | B01D/61/08 |
| JP | 05 168869 | 7/1993 | 63/10 |
| JP | 11235520 | 8/1999 | 63/10 |
| JP | 99 235520 | 8/1999 | 63/10 |
| JP | 00 042378 | 2/2000 | 63/10 |

OTHER PUBLICATIONS

Da Costa et al., "Optimal Channel Spacer Design For Ultrafiltration," *Journal of Membrane Science*, vol. 62, Elsevier Science Publishers B.V., Amsterdam, 1991, pp. 275–291.

(Continued)

*Primary Examiner*—Joseph Drodge
*Assistant Examiner*—K S Menon

(57) ABSTRACT

The present invention is an improved feed spacer, spiral wound element incorporating said feed spacer, filtration system and a method for making and using the same. In one embodiment the present invention includes an improved spiral wound element having: a central collection tube with a plurality of openings along its length to receive permeate; at least one filtration envelope extending outwardly from and wound about the tube and at least one feed spacer sheet wound about the collection tube wherein the feed spacer sheet being in planar contact with the outer surface of at least one filtration envelope. The feed spacer sheet is a net comprising a first set of substantially parallel filaments crossed with a second set substantially parallel filaments to form a plurality of parallelograms having an acute angle less than 70°, the net oriented such that a line bisecting said acute angle is approximately parallel to the axis of the central collection tube and wherein the net has a strand thinning parameter greater than 1.3.

10 Claims, 5 Drawing Sheets

U.S. PATENT DOCUMENTS

| | | | | |
|---|---|---|---|---|
| 3,743,098 | A | | 7/1973 | Martinez ................... 210/321 |
| 3,957,565 | A | | 5/1976 | Livingston et al. ......... 156/500 |
| 4,022,592 | A | | 5/1977 | Saaski ........................ 55/189 |
| 4,022,692 | A | | 5/1977 | Janneck ................. 210/321 B |
| 4,062,756 | A | | 12/1977 | Jha et al. ................... 204/301 |
| 4,123,491 | A | * | 10/1978 | Larsen ....................... 264/167 |
| 4,152,479 | A | | 5/1979 | Larsen ....................... 428/224 |
| 4,213,858 | A | | 7/1980 | Boberg et al. ........... 210/23 R |
| 4,271,023 | A | | 6/1981 | Giovannetti et al. ........ 210/321 |
| 4,476,022 | A | | 10/1984 | Doll .......................... 210/21.5 |
| 4,802,982 | A | | 2/1989 | Lien .......................... 210/247 |
| 4,820,413 | A | | 4/1989 | Lopez ................... 210/321.83 |
| 4,834,881 | A | | 5/1989 | Sawada et al. ........ 210/321.74 |
| 4,861,487 | A | | 8/1989 | Fulk, Jr. ..................... 210/644 |
| 4,902,417 | A | | 2/1990 | Lien ...................... 210/321.74 |
| 4,944,877 | A | | 7/1990 | Maples ................. 210/321.74 |
| 5,096,584 | A | | 3/1992 | Reddy et al. .......... 210/321.74 |
| 5,538,642 | A | | 7/1996 | Solie .......................... 210/652 |
| 5,667,869 | A | | 9/1997 | Beretta ....................... 428/131 |
| 5,681,467 | A | | 10/1997 | Solie et al. ................. 210/486 |
| 6,224,767 | B1 | * | 5/2001 | Fujiwara et al. ......... 210/323.1 |

OTHER PUBLICATIONS

Da Costa and Fane, "Net–Type Spacers: Effect of Configuration on Fluid Flow Path and Ultrafiltration Flux," *Ind. Eng. Chem. Res.*, vol. 33, No. 7, 1994, pp. 1845–1851.

Da Costa, et al., "Spacer Characterization and Pressure Drop Modeling in Spacer–Filled Channels for Ultrafiltration," *Journal of Membrane Science*, vol. 87, Elsevier Science Publishers B.V., Amsterdam, 1994, pp. 79–98.

Fárková, "The Pressure Drop in Membrane Module With Spacers," *Journal of Membrane Science*, vol. 64, Elsevier Science Publishers B.V. Amsterdam, 1991, pp. 103–111.

Feron and Solt, "The Influence of Separators on Hydrodynamics and Mass Transfer in Narrow Cells: Flow Visualisation", *Desalination*, vol. 84, Elsevier Science Publishers B.V., Amsterdam, 1991, pp. 137–152.

Karelin and Polyakov, "Turbulence Promoter Geometry: Its Influence On Salt Rejection and Pressure Losses of a Composite–Membrane Spiral Wound Module," *Journal of Membrane Science*, vol. 75 Elsevier Science Publishers B. V., Amsterdam, 1992, pp. 205–211.

Kottke and Zimmerer, "Effect of Spacer Geometry On Pressure Drop, Mass Transfer, Mixing Behavior, and Residence Time Distribution," *Desalination*, vol. 104, 1996, pp.129–134.

Miquel and Schock, "Mass Transfer and Pressure Loss in Spiral Wound Modules," *Desalination*, vol. 64, Elsevier Science Publishers B.V., Amsterdam, 1987, pp. 339–352.

Mulder, *Basic Principles of Membrane Technology*, Kluwer Academic Publishers, Dordrecht, The Netherlands, 1991 Chapter 8, "Module and Process Design," pp. 312–351.

* cited by examiner

SPIRAL WOUND ELEMENT WITH IMPROVED FEED SPACE

FIELD OF THE INVENTION

The present invention is an improved feed spacer, spiral wound element incorporating said feed spacer and a method for making and using the same.

BACKGROUND

Pressure-driven membrane separation processes allow a broad range of neutral and ionic species to be removed from fluids. In order of decreasing pore size, membranes are commonly classified into several categories: microfiltration (MF), ultrafiltration (UF), nanofiltration (NF) and reverse osmosis (RO). Microfiltration is used for removal of suspended particles having particle sizes greater than 0.1 microns. Ultrafiltration commonly excludes dissolved molecules having molecular weights greater than 5,000 daltons. Nanofiltration membranes pass at least some salts but usually have high retention of organic compounds having molecular weights greater than approximately 200 daltons. Reverse osmosis membranes have high retention of almost all species.

An alternative means of characterizing membranes is by their method of formation. MF and UF membranes can be made by a wide variety of techniques and commercially significant methods include etching, sintering, partial fracture by stretching, and phase-inversion. NF and RO membranes are generally made by either phase inversion or interfacial polymerization. Interfacial polymerization results in a composite structure having a very thin discriminating layer with high selectivity affixed to a porous support and it is by far the dominate procedure for creating NF and RO membranes. Interfacial polymerization can be performed with a wide variety of monomers as is described in U.S. Pat. No. 6,337,018 incorporated herein in its entirety by reference.

NF and RO membranes are most commonly used in applications such as desalination of seawater or brackish water, production of ultrapure water, color removal, waste water treatment, and concentration of liquids for food products. A critical factor in almost all NF and RO applications is that the membrane achieve high rejection of small solute molecules while maintaining high flux.

A spiral wound element is the most common configuration for RO and NF membranes. A classic spiral wound element design is illustrated in FIG. 1. "Feed" liquid flows axially through a feed spacer sheet and exits on the opposite end as "concentrate". "Permeate" passes under pressure through membrane envelopes and is directed to a permeate collection tube by a permeate carrier sheet. In comparison to alternative configurations (hollow-fiber, plate-and-frame, and tubular modules), spiral wound elements often have a favorable combination of low cost, low polarization, and low pressure drop across the element.

Element performance can be further enhanced with optimal element design. For example, it is possible to simultaneously vary the number of envelopes in an element and their lengths to optimize efficiency. For the same element diameter, increasing the number of envelopes in an element results in less active area since more envelopes means more inactive end regions. However, increasing envelope length (as measured in the direction perpendicular from the axis of collection tube) results in greater pressure drop within the longer permeate carrier sheets and this can also decrease element flow during operation. (An increased pressure drop within the permeate carrier sheets results in less flux—flow per unit of membrane area.) For a given set of conditions, the optimal trade-off between envelope length and the number of membrane envelopes can be made to maximize flow. The same trade-off also impacts solute rejection which is maximized for element designs with a larger number of envelopes and shorter individual envelope lengths. Assuming knowledge of several parameters including expected operating conditions, the required element diameter, the active width of membrane envelopes and the thickness of element materials (feed spacer, permeate carrier, and membrane), the impact of trade-off between flow and rejection can be predicted and optimized.

Spiral wound elements are usually placed inside of a cylindrical pressure vessel for operation. While there are exceptions, makers of spiral wound elements and the vessel that enclose them have converged on a few standard dimensions. Nominal diameters of 50 mm, 60 mm, 100 mm and 200 mm are most common for RO/NF elements. Elements having 60 mm diameter are usually available as approximately 350 mm, 530 mm, or one meter long, measured along the axis from the ends of slightly extended permeate collection tubes. Elements with diameters of 100 mm or 200 mm are usually available only in a one meter length. Vessels are created to hold an integral number of these elements in series. One reason for these standard element lengths is that the industry has commonly made membrane with a width of approximately one meter and the stated lengths allow for efficient use of this membrane. The permeate carrier and feed spacer sheets can be also be cut efficiently from meter wide rolls. Assigning the axial dimension of a spiral wound element to be an integral fraction of one meter allows the length of individual membrane envelopes to be unconstrained by materials.

In commercial RO and NF applications, a large filtration system may be composed of more than 10,000 elements, usually distributed in pressure vessels containing 4 to 7 elements each. The pressure vessels have ports for inputting the pressurized feed solution and removing the concentrate and permeate solutions. Feed flows axially through each of the elements in series. By connecting the permeate collection tubes of different elements, the effect is to create one long element in a vessel. Each pressure vessel can be further combined in series or parallel with other vessels to create a filtration system. A filtration system can be operated with re-circulation where concentrate is re-pressurized and allowed to pass several times through a vessel or in 'single-pass' mode, where solution passes only once through any portion of the system. Large single-pass filtration systems are typically arranged in a tapered design where the concentrate from several upstream vessels feeds a smaller number of downstream vessels. While such systems may achieve high recovery with high cross flow, they are also characterized by a long continuous feed path and high pressure drop. System design can be further complicated by incorporating a variety of other options, including booster pumps, permeate pressurization, and cascading stages. Appropriate system design allows the desired recovery and permeate quality to be achieved, and many of the available options are described and illustrated in Marcel Mulder, "Basic Principles of Membrane Technology", Chapter 8, Kluwer Academic Publishers, Dordrecht, The Netherlands, (1991).

Separation efficiency in RO or NF spiral wound elements is dictated by pressure and concentration gradients across the membrane. The flux (volumetric flow per unit area of membrane) of the solvent (most often water) is generally proportional to the net-driving pressure. This net-driving pressure is defined as the difference in feed and permeate applied pressures minus the osmotic pressure differential across the membrane. Solvent flux goes down for high solute concentration and low transmembrane pressure. By contrast, solute molecules commonly pass through RO and NF membrane based on diffusion and this process is ideally driven by a concentration gradient and not affected substantially by the pressure gradient. As a consequence, the concentration of a well-rejected solute in the permeate is inversely proportional to the net-driving pressure.

The net-driving pressure of an element can be influenced by the pressure drop between the fluid entrance end of a spiral wound element and the exiting end. In operation, a feed solution under pressure is applied to the entrance end of the spiral wound element and it flows axially through the cylindrical element. The resulting pressure drop depends on the volume of feed flowing through the element and the resistance of the feed spacer sheet to this flow. This pressure drop is less (usually much less) than the net-driving pressure. A typical pressure drop across a one meter long RO/NF element would be about 25 kPa when the feed has a superficial velocity of 15 cm/sec in the channel. The superficial velocity may be defined as the volumetric flow divided by the cross sectional area of an empty channel. For a standard commercially available Film Tec™ 200 mm diameter (8 inch) element with 35 $m^2$ (380 $ft^2$) of membrane, the 15 cm/sec corresponds to about 200 $m^3$/day of feed solution. Pressure drop is approximately linear with flow rate.

In a series of elements such as in a vessel, the first element in series operates with higher net-driving-pressure than those at the downstream end resulting in an uneven distribution of flux. One cause for the difference is the fact that feed concentration increases in successive elements resulting in more osmotic pressure. This effect is augmented (and sometimes overshadowed) by the pressure drop down a series of elements. There are several problems with this inhomogeneous utilization of membrane. For the lead elements, high flux can substantially shorten the life of an element due to fouling and scaling. High flux also promotes concentration polarization and polarization decreases the effective rejection of the membrane. Lower flux in the trailing elements is also undesirable, not only because of decreased productivity, but also because lower flux means higher solute concentration in the permeate.

Pressure drop can result in a need for higher overall pressure requiring greater energy input and necessitating higher cost equipment (pumps, piping, vessels, etc.). To reduce pressure drop some vessels are manufactured with a port in the middle of the vessel allowing the feed solution to flow half as far in two directions. Alternatively, this problem can be addressed by the use of either booster pumps between vessels or by permeate pressurization of the lead elements. In any case, these remedial measures result in greater complexity and cost.

Ideally, the problem of pressure drop would be addressed at the source—the feed spacer sheet. Unfortunately, the selection of an optimal feed spacer sheet can be a complex task as several key aspects of the feed spacer sheet are difficult to predict from its structure. In addition to having low resistance to feed flow so as to maintain low pressure drop across the element, the ideal feed spacer would also have other characteristics. The primary purpose of the feed spacer is to separate two membrane sheets, allowing the feed solution to flow across their front surfaces. Towards that end, the ideal permeate spacer sheet (also referred to as "spacer", "net" or "spacer sheet") would have a high density of contacts points with the membrane so that nesting of membrane envelopes is avoided. Nesting results when the contact points of adjacent envelopes become offset during rolling and deformation of the two envelopes decreases a spacer's effective volume. Ideally, the spacer would be thin so that it does not greatly decrease the amount of membrane area that can be packed into an element of a given diameter; it would promote substantial mixing so that solute polarization at the surface of the membrane is small; it would have a smooth surface so as not to damage the discriminating layer of the membrane with which it is in contact; and of course it would also be inexpensive to manufacture and use.

Designing an optimal feed spacer is a balancing of competing concerns. For instance, increasing a spacer's thickness results in less pressure drop but conflicts with the desire to maximize an element's active membrane area. Another important conflict stems from the desire for reduced concentration polarization within an element. Concentration polarization is a phenomena resulting in a higher concentration of solute at the membrane's surface than in the bulk. It is caused by the membrane's selectivity. During operation, solutes in the feed solution are continually driven to the membrane surface by convective transport of the feed. In the absence of mixing, rejected solutes must be removed from the surface by diffusion. Coupling competing mass transfer processes to axial flow results in the solute concentration at the membrane's surface increasing down the length of the channel. The effect is especially important for large solute molecules, high permeate fluxes and low feed velocities in the axial direction. The increased concentration at the membrane's surface results in both decreased permeation of water (due to osmotic pressure, scaling, gel formation or fouling) and increased passage of solute molecules (caused by a greater effective concentration). One purpose of a feed spacer is to cause localized regions of turbulence, breaking up the build-up of polarization. Unfortunately, energy required for mixing at the membrane's surface must necessarily contribute to energy dissipation through the element (pressure drop).

In further regard to pressure drop, two key characteristics of the feed spacer are its thickness (height of the channel) and its void fraction. When the volume of liquid flowing through the spacer is kept constant, increasing either property will generally cause a decrease in pressure drop. The pressure drop of a "net-type" spacer oriented along the flow direction, as shown in FIG. 2, is further characterized in Da Costa, Fane, & Wiley, J. Membrane Science, 87, 79–98 (1994), where formulas recognize its dependence on several geometric characteristics: thickness, void fraction, mesh size, filament diameter, and the angle between filaments. The interrelations between these parameters are recognized and for a constant void fraction, the paper demonstrated the impact of trading mesh size and hydrodynamic angle. (The hydrodynamic angle is defined here as the angle, formed between two filaments, which faces the channel axis.) It was found that when flow, thickness, and void fraction are kept constant, decreasing the hydrodynamic angle resulted in a smaller pressure drop down the flow channel. At the same time a lower hydrodynamic angle (at the same void fraction) resulted in a greater mesh size and a dramatic decrease in mixing, parameterized by the mass transfer coefficient.

Mass transfer and pressure drop within spacers are still too complicated to compute accurately from first principals but several attempts have been made to estimate optimal feed spacer configurations, either analytically or by empirical study. The angle at which two filaments cross and their orientation relative to the feed flow are two related areas that have merited attention in the open literature, as both affect pressure drop and polarization.

In Da Costa, Fane, Fell, & Franken, J. Memb. Science, 62, 275–291 (1991), feed spacer sheets at different orientation were examined during the filtration of dextran through an ultrafiltration membrane. The study used several commercial feed spacers but extra configurations were obtained by varying their orientation in the channel or by removing cross strands to increase void fraction. It was found that the minimum operating cost was obtained with a feed spacer having a hydrodynamic angle of about 80°. A second study, Da Costa, Fane, & Wiley, (1994), more fully characterized these spacers according to geometric characteristics and developed a semi-empirical model for pressure drop that accounted for different sources of energy dissipation. The trade-off between pressure drop and mass transfer was detailed and the model was used to predict optimal net configurations. Predictions confirm the previous experimental results but also elaborated on the ranges of optimal angle and void fraction for ultrafiltration under different flow conditions. At low cross flow velocities it was concluded that a net-type spacer should combine low void fraction (about 0.4) with a hydrodynamic angle between 50° and 120°. A third study by the same authors (Da Costa & Fane, Ind. Eng. Chem. Res., 33, 1845–1851, (1994) found that the size and location of filaments positioned perpendicular to flow was particularly important to mass transfer. Under the conditions examined it was concluded that UF elements would have better mixing and would produce more flow when spacers composed of perpendicular filaments were oriented so that one set of filaments was perpendicular to the flow direction, as compared to when both sets of filaments were oriented at 45° to the channel axis.

In Polyakov & Karelin, J. Membrane Science, 75, 205–211, (1992), a different set of feed spacers were examined for filtration of sodium chloride through reverse osmosis composite membranes. The authors introduced a model for polarization that was dependent on the angle between filaments and the feed flow direction. It was hypothesized that regions between filaments corresponded to developing turbulent flow and that the periodic blockage of membrane by filaments caused regions of polarization attenuation. Based on examination of different spacers, including two that are similar to those used in commercial RO elements, they found the best configuration had a filament angle of 63.5° to the flow direction. This traversing angle is equivalent to a 127° hydrodynamic angle, as previously defined.

In Zimmerer & Kottke, Desalination, 104, 129–134, (1996) the authors examined flow through biplanar spacers formed by stacking two layers of grid rods at different angles. Using flow visualization techniques they characterized two extremes of flow types and related them to two parameters: the traversing angle and the dimensionless mesh size. (The dimensionless mesh size was defined as the mesh size divided by the filament diameter.) Channel flow was found to dominate when the angle was low and the mesh size was short, resulting in poor mixing. 'Corkscrew flow' dominated at the other extreme and it resulted in poor mass transfer between neighboring stream paths. The authors suggested that the two domains can be overlapped by appropriate choices for the angle and dimensionless wavelength allowing a "perfect mixing" that results in homogenous use of the membrane surface. A preferred spacer, based on this mixing criteria, had a hydrodynamic angle of 120° and a dimensionless mesh size of 5.5.

Toray Industries' JP 99235520 describes an element constructed from a web formed by crossing two set of overlapping filaments to result in a hydrodynamic angle between 30° and 80°. Working examples were based on a net-type spacer made with a hydrodynamic angle of 66°, net thickness of 0.7 mm, and a perpendicular spacing between strands of 2.7 mm. When water at 25° C. was passed through the net at 15 cm/s, a pressure gradient of about 46 kPa/m resulted. A related Toray application, JP 00042378, used the same examples and describes an element having a pressure drop of between 10 to 20 kPa when flow is 15 cm/s and between 30–40 kPa when flow is 25 cm/s.

Toray Industries' EP 1029583 is aimed at spacers having higher hydrodynamic angles. Elements were formed using a net of crossed filaments that has a hydrodynamic angle between 58° and 90°. The working examples at 66° appear to be the same as described in JP 99235520, resulting in a pressure gradient of about 46 kPa/m when operated at 25° C. and 15 cm/s. This disclosure also presents operational data for similar elements made with nets having hydrodynamic angles of 57.4° and 75.0°. There was no difference in measured pressure drops but the element falling outside of the ideal range with a hydrodynamic angle of 57.4° demonstrated lower salt rejection and lower flux.

Nitto Denko's JP 05168869 describes an element constructed using a net having one set of filaments parallel to the feed flow direction and the other set of filaments crossing the flow direction at an angle less than 80°. More preferably, this angle is between 20° and 50°. Examples provided use a 0.35 mm thick net having traversing angles of either 25° and 40°. The better of the two spacers demonstrated a pressure loss of about 76 kPa/m for a feed flow rate 15 cm/sec. The described spacer had the particular disadvantage of being asymmetric, so that the two surrounding membranes sheets each will see a different hydrodynamic environment. Also, as pointed out in EP 1029583, this spacer requires advanced net-making techniques when compared to the current art.

Feed spacers for commercial NF and RO elements have been characterized in several sources (e.g. G. Schock, A. Miquel, "Mass transfer and pressure loss in spiral wound modules, Desalination, 64, 339 (1987); S. V. Polyakov and F. N. Karelin, "Turbulence promoter geometry: its influence on salt rejection and pressure losses of a composite-membrane spiral wound module" J. Memb. Sci., 75, 205, (1992)). These are commonly made with a net-type feed spacer having an average thickness of between 0.5 and 2 mm, a perpendicular spacing between filaments of between 1 and 4 mm, a void fraction near 0.9, and a hydrodynamic angle about 90°. The net is oriented so that the flow direction bisects this angle, resulting in a traversing angle of 45°. In the Zimmerer paper, different configurations were studied through construction of spacer sections from stacked grid rods, using several hydrodynamic angles other than 90°. In the Da Costa articles, flow through nets having a variety of different configurations were examined by rotating or modifying existing netting. The Toray patent applications used webs having a variety of hydrodynamic angles. Several patents (U.S. Pat. No. 4,022,692, U.S. Pat. No. 4,861,487, U.S. Pat. No. 4,902,417) also describe low pressure-drop, asymmetric nets, having one filament set oriented parallel to the flow direction. Despite these studies, commercial manufacture of nets for RO/NF elements are still very dominated by the standard 90° netting and a 45° traversing angle, with limitations imposed by both convention and legitimate processing concerns.

Feed spacers for RO and NF elements are commonly formed by a process similar to that described in U.S. Pat. No. 3,067,084. This process begins with simultaneously extruding two sets of filaments to form a tubular biplanar net. In this process, two concentric dies are used, both having a multitude of orifices arranged in a circular pattern. One die rotates relative to the other during extrusion to cause filaments of one set to cross those of the other. The heated polymer filaments are caused to contact and join each other, either at the die face or shortly after existing the die, when they are still soft. The resulting tubular net, comprising the two sets of partially coalesced filaments, is then pulled and spread over an expansion mandrel. This further unifies the two sets of filaments, increases the diameter of the tube to satisfy end-use requirements, and decreases the weight and cost of the net on a unit-area basis.

Alternatively, tubular nets have been produced for elements by a process similar to that described in U.S. Pat. No. 3,700,521. In that case, a first die again extrudes polymer filaments through a plurality of openings arranged in a circle, as above. However, in this method, the second die opens periodically to extrude a full filament at one time, the filament being a continuous circle. The extrusion process brings the circular filament into contact with the others, where they are fused together. A variation of this process, with openings in the first die arranged in a line instead of a circle, is also amenable to directly extruding a flat net.

Either tubular netting structure may be slit along any axis to form a flat net, where crossing filaments form a two-dimensional array of parallelograms. When slitting is parallel to one set of filaments, a non-symmetrical net is formed that has crossing strands on only one side of the spacer. When the diameters and mesh sizes for the two sets of filaments are the same, the parallelograms are actually diamonds and a symmetric net can be achieved by slitting the tubular net parallel to a line through crossing points on opposite corners of a diamond. Intermediate cases exist as well, and the splitting cut determines the machine direction for the resulting flat net. When such a net is rolled up, the "machine direction" is perpendicular (orthogonal) to the axial direction of the roll.

The characteristic angle of a symmetric net is defined as the angle most open to the machine direction. This characteristic angle may be adjusted in the extrusion processes described above, although there are practical limits. Methods similar to those described in U.S. Pat. No. 3,067,084 allow for decreasing the characteristic angle over a reasonable range by increasing the rate at which the net is pulled away from the die and/or by decreasing the relative rotation rate between the two dies. However, at the other extreme, instabilities result at large characteristic angles because of the geometry of proximate filaments at the crossing point and the longer lengths of unsupported filaments approaching the mandrel. In the Conwed method, based on U.S. Pat. No. 3,700,521, the characteristic angle could, in principle, be varied by rotating the first die relative to the second. This would likely be prone to similar difficulties at large characteristic angle. However, the Conwed method is generally used for extruding nets having cross strands perpendicular (90°) to the extrusion direction.

Even more difficult to obtain is the combination of strand thinning and a large characteristic angle. Strand thinning, the stretching or necking of filaments between crossing points, can result from the tension placed on the net during manufacture. Some strand thinning is frequently seen in commercial nets used for RO/NF feed spacers. However, in the processes described above, machine tensions are typically in a direction that tends to decrease the characteristic angle. Difficulties inherent to inducing transverse orientation in the net by the above processes are described in U.S. Pat. No. 4,152,479, which is incorporated herein by reference.

Particularly for RO and NF applications, where small molecules are removed from a feed solution at low applied pressures, it is desired to have a feed spacer sheet with very low pressure drop. At the same time, it is desired that this feed spacer have a small strand spacing so nesting of adjacent layers is minimized and polarization remains acceptable. Further, such a feed spacer would need to be economical to produced and use. Most efficient use requires that the feed spacer's "machine direction" be perpendicular to the axis of the permeate collection tube and this imparts a constraint on the preferred orientation of nets during their production. It is one goal of this invention to provide an economical feed spacer characterized by very low pressure drop, small strand spacing and acceptable polarization, along with spiral wound elements incorporating the same.

SUMMARY OF THE INVENTION

The present invention relates to a spiral wound membrane element with an improved feed spacer sheet and to methods for making and using the same. Consistent with commercially available designs, the feed spacer of the subject element comprises a net having a first set of mutually substantially parallel filaments crossed with a second set of mutually substantially parallel filaments. The improved feed spacer of this invention has a high degree of strand thinning characterized by a narrowing of filaments in the region between crossing points. A measurement of strand thinning for a region between neighboring crossing points is calculated by dividing the effective filament thickness by the corresponding minimum filament width (in the plane of the net).

In one embodiment, the spiral wound elements of this invention have a feed spacer characterized by a strand thinning parameter greater than 1.6, more preferably greater than 1.8.

In another embodiment of this invention, the feed spacer in the spiral wound element is characterized by both a small hydrodynamic angle (<70°) and a large strand thinning parameter (>1.3). More preferably, the hydrodynamic angle is less than 60° and the strand thinning parameter is greater than 1.35. Even more preferable, the hydrodynamic angle is less than 55° and the strand thinning parameter is greater than 1.4. It is also preferably that the machine direction of the new feed spacer is approximately orthogonal to the flow direction. It is further desirable that the new feed spacer be incorporated into elements constructed to obtain high flux at low feed pressures so that the advantages of low pressure drop are best realized.

Another embodiment provides for a filtration system comprising a plurality of spiral would elements positioned in series and having an effective continuous feed path (i.e. an effective continuous feed spacer sheet in the axial direction from one element to the next of the series) having a length in the axial direction (i.e. parallel to the permeate tube), of greater than 2.5 meters, and even greater than 9 meters without augmentation to the applied pressure, e.g. by way of an auxiliary pump. When filtration systems have a tapered design, this continuous length of feed spacer sheet may extend through several elements, vessels, and stages.

The present invention is not limited to the specific embodiments, drawings, and description provided herein. Those skilled in the art will appreciate that the present invention will have broad application and may be used in embodiments other than those specifically described.

BRIEF DESCRIPTION OF THE DRAWINGS

Advantages of this invention and its preferred embodiments may be better understood though reference to the detailed description of the invention, accompanied by figures described below. Within these sections, like reference numerals refer to like elements.

DETAILED DESCRIPTION OF THE INVENTION

Figure 1:
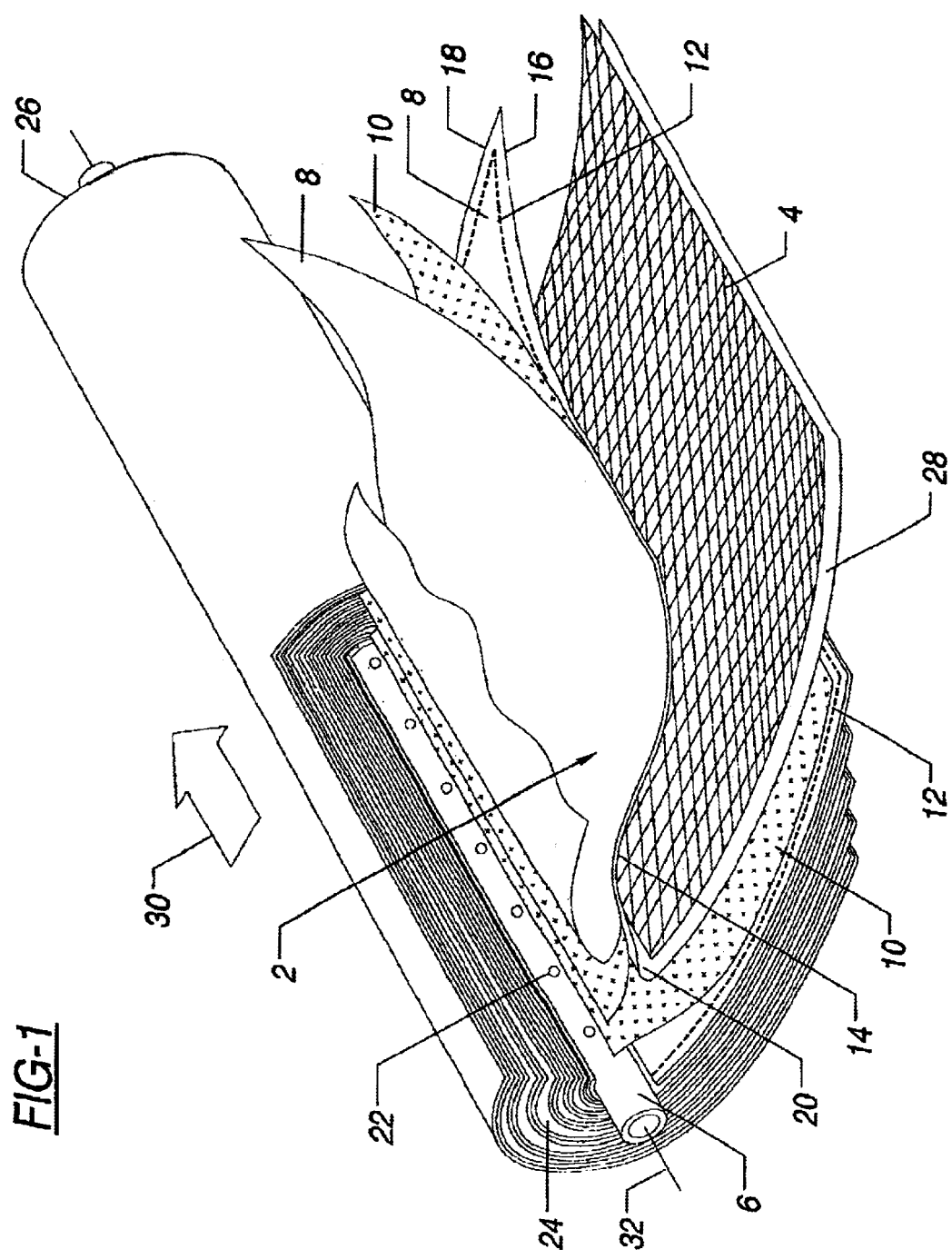
FIG. 1 is a perspective, partially cutaway view of a spiral wound element. The element is formed by alternately wrapping filtration envelopes and feed spacer sheets about a central permeate collection tube. The filtration envelop comprises a permeate carrier sheet sandwiched between two sheets of membrane.

The spiral wound element is the dominant design for incorporating a large quantity of RO or NF membrane into a small volume. The construction of spiral wound elements has been described in more detail elsewhere (see U.S. Pat. Nos. 5,538,642 and 5,681,467 incorporated herein by reference). A classic spiral wound element design is shown in FIG. 1. Such elements are formed by wrapping one or more membrane envelopes (2) and feed spacer sheet (4) about a central permeate collection tube (6). The envelopes (2) comprise two generally rectangular membrane sheets (8) surrounding a permeate carrier sheet (10). This "sandwich" structure is commonly held together by adhesive (12) along three edges (14,16,18), although several other means exist to seal the three envelope edges. The fourth edge (20) of the envelope (2) abuts the permeate collection tube (6) so that the permeate carrier sheet (10) is in fluid contact with openings (22) in the permeate collection tube (6). Each envelope (2) is separated by feed spacer sheet (4) that is also wound about the collection tube (6). The feed spacer (4) is in fluid contact with both ends of the element (24,26) and it acts as a conduit for feed solution across the front surface (28) of the membrane (8). the direction of feed flow (30) is from the entrance end (24) to the concentrate end (26) and this direction is parallel to the axis (32) of the central permeate collection tube (6).

Figure 3:
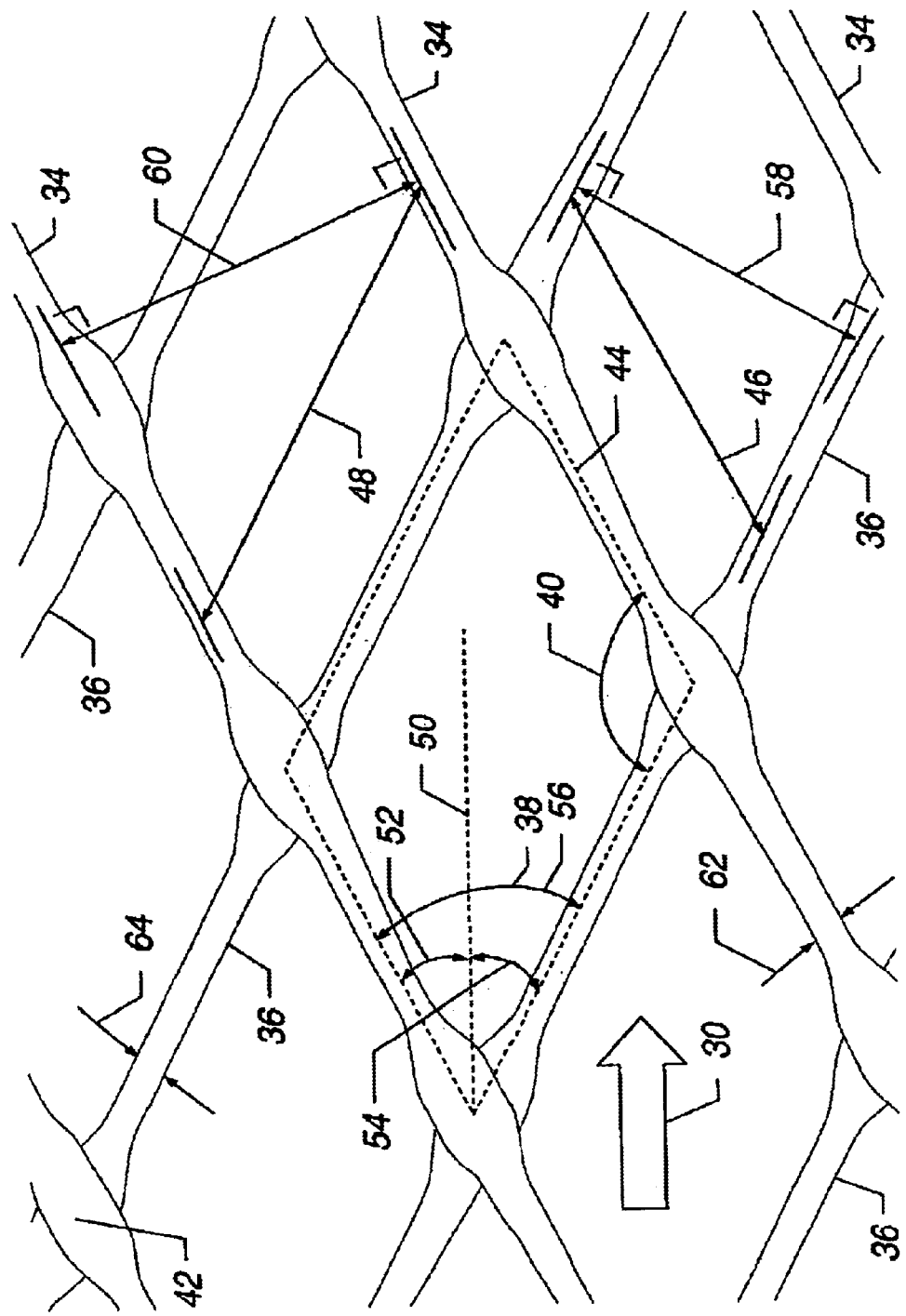
FIG. 3 is a perspective view of a portion of a feed spacer sheet of the present invention a showing strand thinning and several geometric relationships.

The feed spacer sheet (4) of this invention is a non-woven, polymer net. As depicted in FIGS. 3 (and 2), it is formed by crossing a first set of substantially parallel filaments (34) with a second set of substantially parallel filaments (36) at an angle (38,40). The two sets of filaments are affixed to each other at the intersection points (42). The two crossed sets of substantially mutually parallel filaments form a two-dimensional array of similar parallelograms (44) (shown by dotted lines in FIG. 3), the length of their sides defining a mesh size (46,48). Except when the two sets of filaments are perpendicular to each other, parallelograms have both acute (38) and obtuse (40) angles. In the present invention, the acute angle (38) is approximately bisected by a line (50) drawn parallel to the flow direction (30). The angle at which filaments cross the flow direction (30) is then referred to as their traversing angle (52,54).

The net of this invention is preferably made via a continuous process and cut into generally rectangular sheets of feed spacer sheet. Typical extrusion methods used to make continuous nets of crossed filaments are described in U.S. Pat. No. 3,700,521, U.S. Pat. No. 3,957,565, and U.S. Pat. No. 3,067,084. The crossing and joining of filaments may take place after extruding individual polymer filaments or concurrent with the process of forming filaments. Due to natural variation in production, it is not expected that each parallelogram (44) in the net will be identical but the angles (38,40) and mesh sizes (46,48) for a typical parallelogram can be determined by measuring angles, distances and strand counts over a large region of the net.

For the net of this invention the typical parallelogram (44) has an acute angle (38) less than 70° and a corresponding obtuse angle (40) of at least 110°. The hydrodynamic angle (56) for a net is defined as the angle between two filaments (34,36) that is open to the flow direction (30). In this invention, the hydrodynamic angle (56) must be equal to the acute angle (38) for the typical parallelogram (44). This elongated parallelogram (44) allows the net to be oriented so that the hydrodynamic angle (56) and the traversing angles (52,54) are low resulting in minimal resistance to flow.

The diameters of filaments is another characteristic of a net. Diameters may be different for the two sets of substantially mutually parallel filaments (34,36) and typical diameters for each filament set can be most accurately obtained from the polymer density and the mass of polymer extruded into each set of filaments. The typical diameter $D_i$ for one set is then calculated using the formula below, where $L_i$ is the total length of filaments of that type, $M_i$ is the mass of extruded polymer into those filaments, and $\rho$ is the polymer density.

$$\pi L_i D_i^2 / 4 = M_i / \rho$$

When parameters of extrusion are not known, the same formula may be used after separating individual strands and determining the mass of polymer comprising the two types. The typical diameters may also be estimated from visual inspection of the web. In the present invention, the typical filament diameters are preferably between 0.15 and 0.6 mm. Also preferably, diameters are the same for both sets of substantially mutually parallel filaments (34,36) allowing for similar mixing at the surfaces (28) of facing membrane sheets (8).

Figure 2:
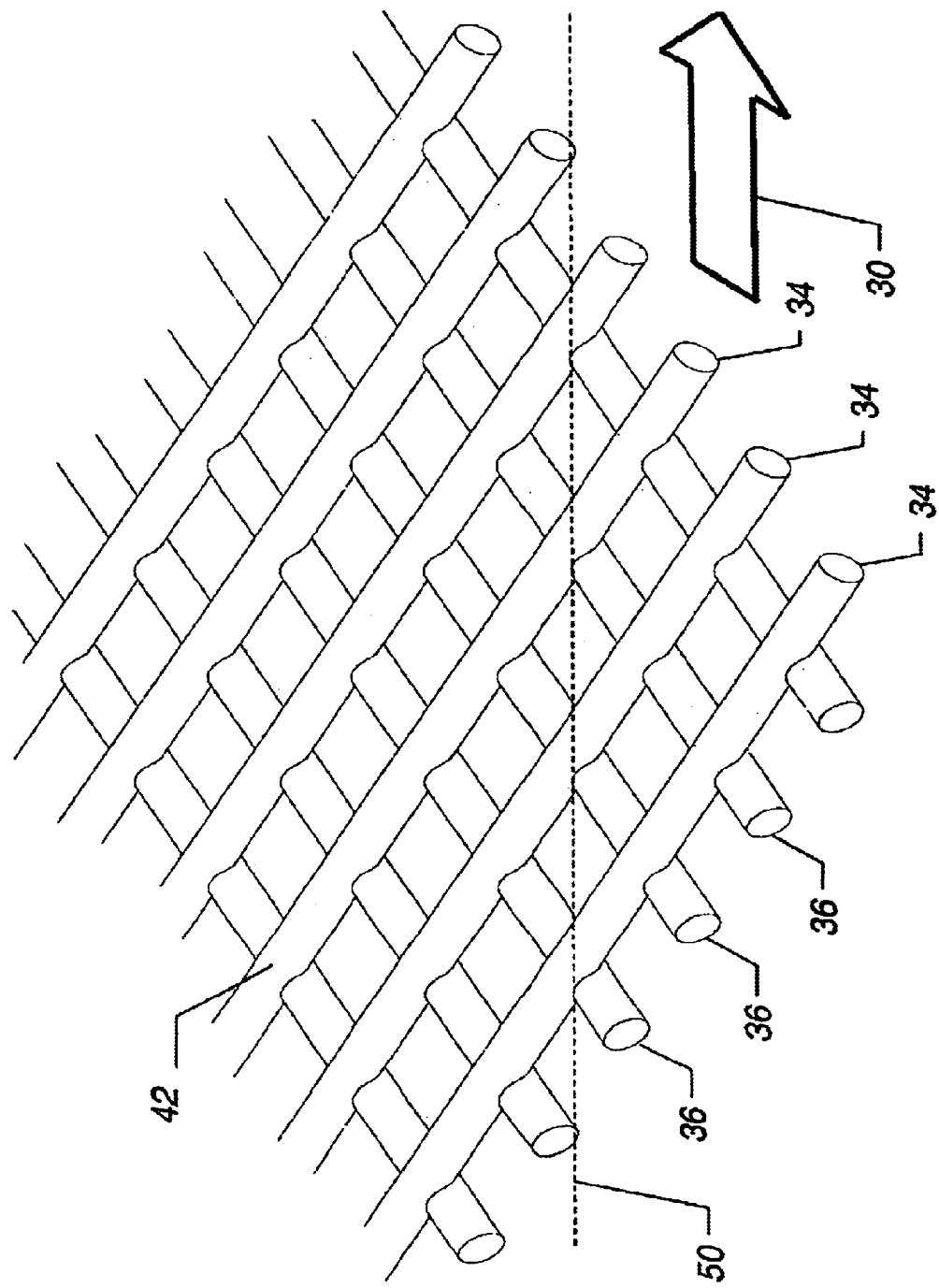
FIG. 2 is a perspective view of a portion of a "net-type" feed spacer sheet having two crossing sets of mutually substantially parallel filaments. Filaments are depicted with significant overlap at the crossing point such that the spacer sheet thickness is less than twice the typical diameter of filaments.

Another characteristic parameter for a net is its thickness. The thickness of a net may be measured by pressing a small section of the net between two flat surfaces and measuring the distance between the flat surfaces. The net thickness is then defined as the average (arithmetic mean) thickness, as determined by measurement of at least 20 separate regions. The thickness of the net may be less than twice the typical filament diameter, since strands can deform at the intersection points (42) and this deformation is typical for conventional extrusion processes (as best shown in FIG. 2). An effective filament thickness may be defined in terms of the net thickness. When the two sets of substantially mutually parallel filaments have the same typical diameter, the effective thickness for each set is half the total net thickness. When the two sets of filaments have different typical diameters the effective thickness for each set is defined to be proportional to its typical diameter such that the sum of the two different effective filament thicknesses adds up to the total net thickness.

The thickness of a net used in the present invention is preferably between 0.25 and 1 mm. Decreased thickness results in greater pressure drop, more propensity to foul, and a likelihood for uneven flow within the element. Increasing the thickness of the net reduces the active area of membrane that can be packed into an element. Increasing net thickness also decreases the superficial velocity of fluid that moves through the channel for a given volumetric flow rate, and this worsens polarization.

The mesh size (46,48) is the distance between filament crossing points, corresponding to the length of sides for the typical parallelogram (44). A very related measurement is the strand spacing (58,60), defined as the perpendicular distance between filaments of a set. The preferred net would have strand spacing values between 1 and 5 mm for both sets of filaments. When strand spacing (58,60) of the feed spacer (4) increases, nesting of adjacent envelopes (2) during element rolling becomes a problem and this nesting increases pressure drop. Additionally, it is thought that low strand spacing and low mesh size improve polarization resulting in more frequent regions of turbulent flow. At the other extreme, when strand spacing and mesh size are too small, pressure drop increases and the net is more difficult to produce. It is not necessary that strand spacing be identical for both sets of filaments but this is preferable since it is desirable that mixing at the front surfaces (28) of facing membrane sheets (8) be similar.

The void fraction compares the volume of free space available for fluid flow to the total volume between two surfaces (28) separated by the net. For a net formed of crossing rods, the polymer volume associated with a unit cell, such as the typical parallelogram (44) can be mathematically estimated from the parameters described above. Dividing this volume by the total volume associated with that unit cell results in an estimated polymer fraction for the net. For a net where filaments share some of the same volume at intersection points (42), the polymer fraction may be more accurately determined by direct measurement using a volume displacement method. In either case the void fraction is simply one minus the polymer fraction. The net of this invention preferably has a void fraction greater than 0.8, and more preferably greater than 0.9, allowing low pressure drops to be maintained.

A key aspect of the present invention is that the net has an appreciable amount of strand thinning. Strand thinning is a narrowing of the filaments in the region between crossing points (42). A measurement of strand thinning for a region between neighboring intersection points is acquired by dividing the effective filament thickness, previously defined, by the corresponding minimum filament width (62,64) in the plane of the net for that region. A strand thinning parameter for each set of filaments is then similarly defined as the corresponding quotient obtained after first averaging (by arithmetic mean) measured minimum widths (62,64) for at least 20 filaments sections from that set. A strand thinning parameter for the net is the average of the strand thinning parameters for each set of mutually substantially parallel filaments (34,36). The net of this invention preferably has an average strand thinning parameter greater than 1.3, (1.35, 1.4, 1.6 and even 1.8).

As noted earlier, elements have previously been constructed using nets with some degree of strand thinning. It will be evident from examples that the preferred nets demonstrated in this specification have a very high strand thinning parameter (>1.8) and it appears that using severely stretched nets in spiral wound elements has not previously been anticipated. However, it is the combination of low hydrodynamic angle (56) and strand thinning that is considered to be particularly important. Strand thinning allows a high void fraction to be maintained for nets having both low angle and low strand spacing. The result is an element with low pressure drop that both avoids nesting and high polarization.

It should also be pointed out that the strand thinning parameter defined also incorporates the degree of deformation at the crossing points (42) between filaments (34,36). A net of non-overlapping tangential cylinders has a strand thinning parameter of unity. Since deformation at the crossing points (42) acts to decrease void fraction and increases pressure drop, it is reflected as a decreased strand thinning parameter. A strand thinning parameter less than one is possible. Deformation at the crossing points (42) can occur by several means but nets stretched to achieve a high strand thinning parameter will commonly also have increased deformation that results in a thinner net. Consequently, a high strand thinning parameters suggests a process optimized to elongate filaments at their centers and avoid deformation at their intersection points (42).

Another key aspect of this invention relates to the orientation of the net's machine direction when it is used in the element. The net of this invention preferably has a machine direction corresponding to the long dimension of the flat, continuous net, from which sheets are cut. When the net is formed by splitting a tubular extrudate, the machine direction is parallel to the splitting cut. The machine direction defines the orientation of a flat net that that may be continuously rolled up during its production. The axial dimension of such a roll is perpendicular to the machine direction. A net having an axial dimension that corresponds to one of the standard element lengths allows elements to be constructed with minimum scrap. Orienting a net such that its machine direction is perpendicular to the permeate collection tube (6) also results in the flexibility to vary envelope lengths as desired. Elements of this invention are preferably constructed with a net in this orientation.

In the spiral wound element of this invention, the hydrodynamic angle (56) is less than 70°, more preferably less than 60°, and most preferably less than 55°. The net is oriented such that the hydrodynamic angle (56) is approximately bisected by the flow direction. By "approximately bisected" it is meant that the line bisecting the hydrodynamic angle (56) is within 10° of parallel to the permeate collection tube (6). In this way, both sets of filaments (34,36) make approximately the same traversing angle (52,54) with the direction of feed flow (30) through the element. As noted also with filament diameter and strand spacing, the resulting symmetry allows two facing sheets of membrane (8) to have similar polarization and results in homogeneous utilization of membrane area. For purposes of this disclosure, a symmetric feed spacer is one in which both sets of filaments have approximately equal strand spacing (58,60), typical diameter and traversing angle (52,54).

The feed spacers (4) used to construct elements of this invention have been seen to have very low pressure gradients. Using a flowing cell similar to that described by Da Costa (1991), a net with low hydrodynamic angle (56) and high strand thinning showed 7.1 kPa/m at 15 cm/sec. At 0.05 and 0.25 cm/sec, it was 2.1 and 12.5 kPa/m respectively. A FilmTec™ 4040 element (100 mm in diameter and one meter long) constructed from the same material demonstrated approximately 6.1 kPa/m at 15 cm/sec. This value compares favorably to those for elements made with low pressure drop spacers in JP 99235520 and JP 05168869 and to those for elements made with typical commercial spacer material. This substantially improved pressure drop is a result of both the high void volume and the low hydrodynamic angle (56), the latter being accountable for less resistance from form and viscous drag.

In addition to the lower construction and operating costs for a filtration system that uses the subject elements, it appears that polarization for the claimed elements is very acceptable. Examples will demonstrate that a system containing elements having the new feed spacer sheet can have improved flow and salt passage compared to elements constructed with standard feed material. The subject feed spacer is particularly advantageous when applied pressure is low and several elements exist in series. For example, in filtration systems wherein elements are positioned in series to create an effective continuous feed path (i.e. an effective continuous feed spacer sheet in the axial direction from one element to the next of the series) having a length in the axial direction (i.e. parallel to the permeate tube), the present feed spacer permits effective lengths of greater than 2.5 meters, and even greater than 9 meters to be used without augmentation to the applied pressure, e.g. by way of an auxiliary pump. When filtration systems have a tapered design, this continuous length of feed spacer sheet may extend through several elements, vessels, and stages.

The prediction of mass transfer for the purpose of spacer design is complicated and stretches the limit of current computing power. To a large extent, the improvement in passage can be understood in terms of the high flux obtained with low pressure drop. However, literature suggests that lower hydrodynamic angles (56) are expected to substantially worsen polarization. While it is not be meant to be limiting to the invention, an explanation may be proposed for the favorable mixing observed with this spacer despite its lower hydrodynamic angle (56). One explanation is that stagnant regions caused by direct contact with the membrane front surfaces (28) are avoided by the suspended, stretched filaments. This is in contrast with earlier experimental results (Feron, Desalination, 84, 1991, 137–152) that suggest mixing is less effective for suspended rods than for rods attached to a membrane's surface, but that study was performed with much larger structures (both filaments and channels) where dynamics may be different. An alternative explanation is that strand thinning maintains a high void volume while allowing more frequent interruptions in developing polarization, due to close strand spacing (58,60).

To achieve a low hydrodynamic angle (56) using the preferred net orientation requires that the machine direction of the net segment the large (obtuse) angle (40) of the parallelogram (44). A small hydrodynamic angle (56) corresponds to a large characteristic angle for the net. Previous methods commonly used in producing continuous nets for RO elements are limited in their ability to achieve the desired combination of a large characteristic angle relative to the machine direction and a low mesh size (46,48). In the Zimmerer article, a large range of angles was obtained by simulating realistic spacers using stacked rods. Low hydrodynamic angles (56) were examined in the Da Costa papers by rotation of nets that were formed by more conventional methods. Large characteristic angles (greater than 110°, corresponding to a hydrodynamic angle of less than 70°) are problematic by methods currently used to make biplanar feed spacers.

A further problem for nets made with the preferred orientation is to simultaneously maintain high void volume, low hydrodynamic angle (56), and tight strand spacing (58,60). A solution is strand thinning, but thinning that may result from extension in the machine direction is generally incompatible with the combination of a low hydrodynamic angle (56) and the preferred orientation of the machine direction. Forces tending to stretch the net would also tend to increase this angle. Examples in this work have been created using a net-making process that induces strand thinning by stretching the net perpendicular to the machine direction after it is formed. While this process requires an extra step, it can economically provide a net that allows elements to be formed with the desired combination of angle, strand spacing, net orientation, and void volume.

EXAMPLES

While not intending to limit the scope of invention, the present invention is further illustrated by the following non-limiting examples:

Example I

A feed spacer was made according to the process described below: As is typical in the art, a tubular net was formed by crossing two sets of filaments simultaneously extruded from two concentric, counter-rotating dies. The tubular structure was pulled over a mandrel and quenched in a water bath. After slitting, the resulting flat net had a width of 48.3 cm, a strand spacing of 2.12 mm, an average net thickness of 0.94 mm, and a characteristic angle of 85°. The slitting defined a machine direction for the net that was approximately parallel to the line bisecting the characteristic angle.

In parting from the conventional process of forming feed spacers for spiral wound elements, a tentering step was added to the process. The flat net was heated and stretched perpendicular to the machine direction. This tentering was done at 100° F. (Tentering may be performed over a wide range of temperatures, as described in U.S. Pat. No. 4,152,479. It was found that lower temperatures advantageously allowed high strand thinning while the net was homogeneously stretched.) The resulting flat net had a width of 125.7 cm, a strand spacing of 3.28 mm, a characteristic angle of 129.3°, and a strand thinning parameter of 2.38. Table I lists these and other geometric properties measured after tentering.

Figure 4:
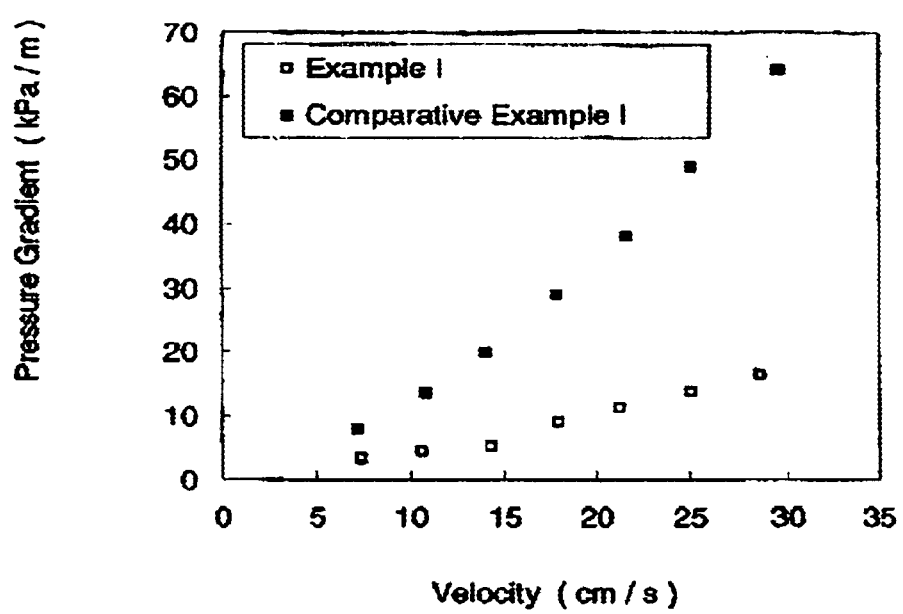
FIG. 4 is a graph of pressure drop as a function of superficial velocity for Example I and Comparative Example I.

A flat cell having a length of 914 mm, a width of 127 mm and a channel depth of 1.27 mm was loaded with membrane, feed spacer sheet, and the appropriate shims to fill the channel's free space. The feed spacer described above was oriented such that the flow direction was perpendicular to the machine direction, resulting in a hydrodynamic angle of 50.7°. Water at 25° C. was caused to flow through the cell while maintaining a recovery of less than 5%. The pressure drop across the feed spacer sheet was measured as a function of superficial feed velocity. Results are shown in FIG. 4, along with those from Comparative Example I.

Comparative Example I

A biplanar feed spacer was formed according to conventional methods. This process included extruding two sets of filament through concentric dies, crossing the two sets of filaments to form a tubular net, pulling the net over an expanding mandrel, and splitting the tubular net to form a flat net. This process did not include a perpendicular tentering step, as in Example I. This resulting net had a strand spacing of 2.95 mm, a net thickness of 0.71 mm, a characteristic angle of 90°, and a strand thinning parameter of 1.38. Other geometric properties of the net material are described in Table II. The net was oriented on the flat cell to have a traversing angle of 45°. Pressure drops were measured as a function of superficial velocity, and results are also shown in FIG. 4.

Examples II and III

A process similar to that described in Example I was used to fabricate two other approximately symmetric feed spacers. Geometric properties measured for the two nets, before and after tentering, are shown in Table I. Based on width ratios, the tentering process stretched each net by more than a factor of two. Table I also lists the pressure gradient measured when water at 25° C. was caused to flow through the flat cell unit at 15 cm/sec. In these measurements, the machine direction of the feed spacer sheet was oriented perpendicular to the flow direction resulting in hydrodynamic angles of 47.5° and 60°.

TABLE I

|  | Example 1 | Example 2 | Example 3 |
| --- | --- | --- | --- |
| Width of spacer sheet before tentering (cm) | 48.3 | 48.3 | 53.3 |
| Strand spacing before tentering (mm) | 2.12 | 2.12 | 2.07 |
| Average net thickness before tentering (mm) | 0.94 | 0.84 | 0.81 |
| Characteristic angle before tentering (degrees) | 85.0 | 82.0 | 80.0 |
| Width of spacer sheet after tentering (cm) | 110.5 | 125.7 | 114.3 |
| Strand spacing after tentering (mm) | 3.28 | 3.28 | 2.82 |
| Average net thickness after tentering (mm) | 0.87 | 0.80 | 0.72 |
| Characteristic angle after tentering (degrees) | 129.3 | 132.5 | 120.0 |
| Void fraction after tentering (dimensionless) | 0.939 | 0.926 | 0.908 |
| Typical filament diameter after tentering (mm) | 0.33 | 0.35 | 0.35 |
| Average minimum filament diameter after tentering (mm) | 0.18 | 0.20 | 0.19 |
| Strand thinning parameter after tentering (dimensionless) | 2.38 | 1.99 | 1.85 |
| Hydrodynamic angle of net in flat cell (degrees) | 50.7 | 47.5 | 60.0 |

TABLE I-continued

|  | Example 1 | Example 2 | Example 3 |
|---|---|---|---|
| Measured pressure gradient for net at 15 cm/sec (kPa/m) | 7.11 | 8.37 | 10.53 |

Comparative Examples II to IV

Comparative Examples II and III are based on feed spacers used to fabricate FilmTec™ NF270-400 elements. Comparative Example IV is based on a commercial biplanar net (P2809 Halar Plastinet) manufactured by Delstar Technologies, Inc. Geometric characteristics of the three approximately symmetric nets were measured, and values are listed in Table II. It can be noted that the principal difference between the net of Example IV and the nets of Examples I–III is in strand thinning. The three nets were tested with water flowing at 15 cm/sec, as described in Example I, and measured pressure gradients in Table II are seen to be large compared to values in Table I.

Comparative Example V

A biplanar net is made by crossing two sets of filaments simultaneously extruded from two concentric dies. In contrast to Comparative Example I, the relative rate of rotation between the two extrusion dies was reduced to result in a smaller characteristic angle. Except for that change, the process of net formation was the same. The difference resulted in a smaller characteristic angle and a decreased strand thinning parameter. Pressure drop was measured for this material after orienting it on the flat cell with the machine direction parallel to the flow direction. In this way, the small characteristic angle corresponded to a small hydrodynamic angle. Results of geometric measurements and the pressure gradient measured at 25° C. are recorded in Table II. The pressure gradient is large compared to values in Table I.

Example IV, Example V, and Comparative Example VI

Four FilmTec™ NF270-4040 spiral wound element were fabricated using standard feed spacer sheet, similar to that in Comparative Examples II and III. The commercial NF270-4040 elements are approximately one meter long and 100 mm in diameter, and they contain 7.0 m² of active membrane area. Eight additional elements of the same design were constructed using different feed spacer sheet. Four contained the feed spacer of Example I and four contained the feed spacer of Example II. In each case, the machine direction of the net was perpendicular to the central collection tube.

Figure 5:
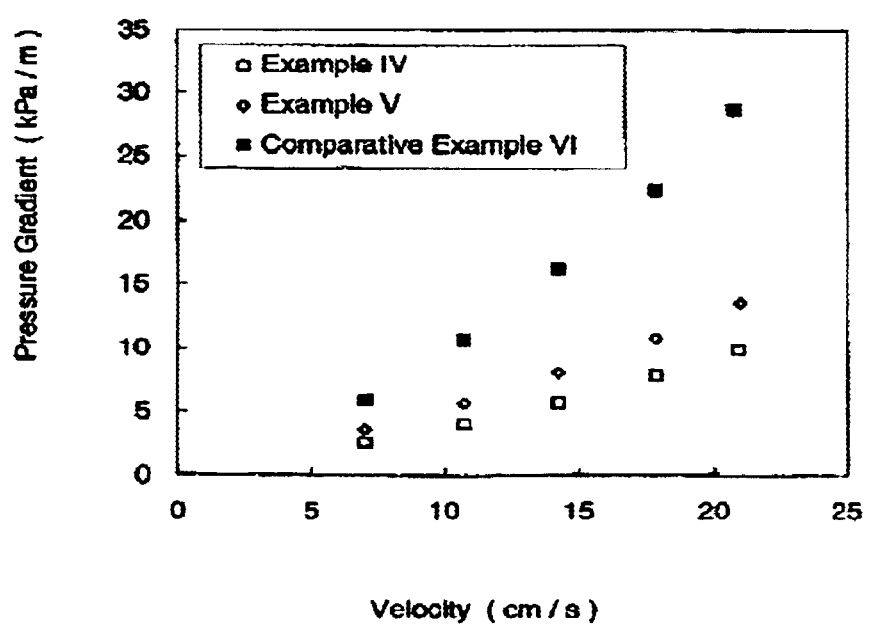
FIG. 5 is a graph of the average pressure gradients as a function of velocity for Example IV, Example V and Comparative Example VI.

Elements were sequentially loaded into a single element vessel and the pressure drop was measured as a function of the superficial feed velocity. The feed solution contained only water, and the flux of elements at 25° C. averaged 68 l/m²/hr with 350 kPa applied pressure. Permeate flow was blocked during pressure drop measurements to maintain a constant feed velocity across the element. FIG. 5 shows average pressure gradients determined for each of the three types of elements at 25° C. Examples IV and V correspond to elements constructed with the feed spacers of Examples I and II, respectively.

Example VI and Comparative Example VII

The feed spacers of Example II and Comparative Example I were run in the presence of 100 ppm NaCl on the 914 mm long flat cell. The orientation of feed spacers in the flat cell was the same as described previously. Using FilmTec™ NF90 membrane, performance properties (flux, salt passage, and pressure drop) were recorded when operating the system at 140 kPa and a superficial feed velocity of 32 cm/sec. This data is provided in Table III, and it shows that the new net compares favorably with conventional material.

TABLE III

| Net type | Pressure gradient (kPa/m) | Permeate Flow (Liters/min) | Permeate Concentration (ppm) |
|---|---|---|---|
| Example I | 18.1 | 0.0292 | 6.26 |
| Comparative Example I | 79.9 | 0.0221 | 6.81 |

Example VII and Comparative Example VIII

Four spiral wound elements from Example IV, those using the feed spacer of Example I, were loaded and run in series with 100 ppm NaCl. The applied pressure at the inlet to the first element was 344 kPa, and the concentrate flow rate was set to 39 liters per minute. The four NF270-4040 elements of Comparative Example VI were then tested with same applied pressure and concentrate flow rate. Results in Table IV for elements fabricated with the new feed spacer show favorable values for pressure drop, flow and salt passage.

TABLE II

|  | Comparative Example 1 | Comparative Example 2 | Comparative Example 3 | Comparative Example 4 | Comparative Example 5 |
|---|---|---|---|---|---|
| Strand spacing (mm) | 2.95 | 2.94 | 2.91 | 2.62 | 2.77 |
| Average net thickness (mm) | 0.71 | 0.70 | 0.74 | 0.78 | 0.79 |
| Characteristic angle (degrees) | 90.0 | 90.0 | 90.0 | 90.0 | 46.0 |
| Void fraction (dimensionless) | 0.903 | 0.907 | 0.907 | 0.851 | 0.840 |
| Typical filament diameter (mm) | 0.36 | 0.35 | 0.36 | 0.44 | 0.47 |
| Average minimum filament diameter (mm) | 0.26 | 0.28 | 0.27 | 0.41 | 0.42 |
| Strand thinning parameter (dimensionless) | 1.38 | 1.26 | 1.36 | 0.95 | 0.94 |
| Hydrodynamic angle in flat cell (degrees) | 90.0 | 90.0 | 90.0 | 90.0 | 46.0 |
| Pressure gradient for net (kPa/m) | 22.3 | 19.0 | 17.0 | 27.1 | 18.0 |

The recorded pressure drop is the summed value due to all four elements in series.

TABLE IV

| Element type | Pressure drop (kPa) | Permeate flow (Liters/min.) | Salt Passage (%) |
| --- | --- | --- | --- |
| Standard NF270-4040 | 106.8 | 13 | 14 |
| Elements made with feed spacer of Example I | 33.6 | 15 | 11 |

What is claimed is:

1. An improved spiral wound element having:
    a central collection tube defining an axis and having a plurality of openings along its length to receive permeate;
    at least one filtration envelope extending outwardly from and wound about said tube, said filtration envelope comprising two sheets of membrane and a permeate carrier sheet sandwiched between said sheets of membrane; said permeate carrier sheet being in direct fluid communication with said openings of said collection tube;
    at least one feed spacer sheet wound about said collection tube, said feed spacer sheet being in planar contact with the outer surface of at least one filtration envelope;
    wherein the improvement is characterized in that said feed spacer sheet is a net comprising a first set of substantially parallel filaments crossed with a second set of substantially parallel filaments to form a plurality of parallelograms having an acute angle less than 70°, said net oriented such that a line bisecting said acute angle is approximately parallel to the axis of the central collection tube, and wherein said net has a strand thinning parameter greater than 1.3.

2. The spiral wound element of claim 1 wherein the feed spacer sheet has an average thickness less than 1 mm and the first and second set of filaments have strand spacing values between and 1 mm and 5 mm.

3. The spiral wound element of claim 2 wherein said parallelograms have an acute angle less than 60° and said net has a strand thinning parameter greater than 1.35.

4. The spiral wound element of claim 3 wherein said parallelograms have an acute angle less than 55° and said net has a strand thinning parameter greater than 1.4.

5. The spiral wound element of claim 3 wherein said net has a machine direction that is approximately orthogonal to the axis of said collection tube.

6. The spiral wound element of claim 1 wherein the element has a pressure gradient in the axial direction of less than 10 kPa/m when operated with a superficial velocity of 0.15 m/s.

7. The spiral wound element of claim 1 wherein the element has an average flux of at least 40 $l/m^2/hr$ when operated at 25° C. with a pure water feed and a net-driving pressure of 350 kPa (51.0 psi).

8. The spiral wound element of claim 7 wherein the element has an average flux of at least 65 $l/m^2/hr$ when operated at 25° C. with a pure water feed and a net-driving pressure of 350 kPa (51.0 psi).

9. An improved spiral wound element having:
    a central collection tube with a plurality of openings along its length to receive permeate;
    at least one filtration envelope extending outwardly from and wound about said tube, said filtration envelope comprising two sheets of membrane and a permeate carrier sheet sandwiched between said sheets of membrane; said permeate carrier sheet being in direct fluid communication with said openings of said collection tube;
    at least one feed spacer sheet wound about said collection tube, said feed spacer sheet being in planar contact with the outer surface of at least one filtration envelope;
    wherein the improvement is characterized in that said feed spacer sheet is a net comprising a first set of substantially parallel filaments crossed with a second set substantially parallel filaments to form a plurality of parallelograms, said net having a strand thinning parameter greater than 1.6.

10. The spiral wound element of claim 9 wherein said net has a strand thinning parameter greater than 1.8.

* * * * *